United States Patent [19]
Fish et al.

[11] 3,916,060
[45] Oct. 28, 1975

[54] FIBER MODIFIED POLYURETHANE FOAM FOR BALLISTIC PROTECTION

[75] Inventors: Richard H. Fish; John A. Parker, both of San Jose; Robert W. Rosser, Los Altos, all of Calif.

[73] Assignee: The United States of America as represented by the United States National Aeronautics and Space Administration Office of General Counsel - Code GP, Washington, D.C.

[22] Filed: Sept. 19, 1973

[21] Appl. No.: 398,885

[52] U.S. Cl............ 428/303; 260/2.5 AK; 427/196; 427/426
[51] Int. Cl.².. C08G 18/14; C08K 3/40; C08K 7/14
[58] Field of Search........... 260/2.5 AK; 117/26, 27, 117/126 GB; 161/170; 427/426, 196

[56] References Cited
UNITED STATES PATENTS

| | | | |
|---|---|---|---|
| 3,107,057 | 10/1963 | Hanusch | 117/27 |
| 3,249,307 | 5/1966 | Peeps | 117/27 |
| 3,256,218 | 6/1966 | Knox | 260/2.5 AK |
| 3,340,335 | 9/1967 | Winchcombe | 260/2.5 AK |
| 3,382,302 | 5/1968 | Marrzocchi | 264/45 |
| 3,505,436 | 4/1970 | Krug et al. | 264/45 |
| 3,546,060 | 12/1970 | Hoppe | 264/45 |
| 3,582,500 | 1/1971 | Carriere | 260/2.5 AK |
| 3,598,693 | 8/1971 | Andersen | 161/170 |
| 3,671,377 | 7/1970 | Marra | 264/45 |

OTHER PUBLICATIONS

"Dabco – 33LV Low Viscosity Solution," Houdry Process and Chemical Co., Nov. 1, 1963, pp. 1 to 3.

Primary Examiner—Donald E. Czaja
Assistant Examiner—C. Warren Ivy
Attorney, Agent, or Firm—Darrell G. Brekke; Armand G. Morin, Sr.; John R. Manning

[57] ABSTRACT

A closed cell, semi-rigid, fiber-loaded, self-extinguishing ballistic resistant foam and the method for making it is disclosed. The main structure of the material is a semi-rigid polyurethane foam in which are incorporated fiber strands oriented parallel to the surface. Preferably the fibers are glass. Other materials may be added such as fire-retardant materials.

17 Claims, No Drawings

FIBER MODIFIED POLYURETHANE FOAM FOR BALLISTIC PROTECTION

The invention described herein was made by employees of the United States Government and may be manufactured and used by or for the Government for Governmental purposes without payment of any royalties thereon or therefor.

BACKGROUND OF THE INVENTION

1. Field of the Invention

Coating composition containing fireproofing and fiber filler.

2. Description of the prior art

Conventional polyurethane foams are flammable, forming little char residue and producing large volumes of combustible noxious gases. Improvements in conventional foams to make them more resistant to burning have been made by the addition of phosphates, chlorowax and the like for application as insulation and structural members. State of the art modifications have improved the non-burning characteristics of foams as described in U.S. Pat. No. 3,549,564. But this has not improved the ability of these materials to withstand the action of incendiary ballistics. Conventional foams are unsatisfactory in providing the desired fire protection, for such things as military aircraft when penetrated by incendiary bullets, in areas external to the fuel tank.

The use of a flexible, open-cell foam for prevention of incendiary ignition in aircraft void spaces was first demonstrated by the U.S. Army, Ballistics Research Laboratories at Aberdeen, Maryland, and later by NASA-Ames at China Lake, California. The NASA-Ames work also demonstrated that a NASA rigid-foam and fiber-glass mat laminate could also defeat the action of an incendiary projectile.

The flexible, open-cell foam had the disadvantage of acting as a wick to soak up spilled fuel and thus presenting a fire hazard, providing no support for the fuel cell, necessitating encasement of the fuel cell in a supporting container, and providing no fire protection in the event of a fire exterior to the fuel cell.

The rigid-foam fiber-glass material had the disadvantage of costly manufacture, not being able to foam in place, higher weight penalty, and a high transmission of hydraulic pressures from the fuel cells to the aircraft structure.

The modified foams of the present invention are useful in providing effective protection for thermally sensitive structures, against the destructive action of fuel-fires and incendiary ballistics. For this reason these foams are adapted for broad application in both military and commercial fields.

The purpose of this invention is to provide a closed cell, semi-rigid, fiber-loaded, self-extinguishing, ballistic resistant foam to fill the void spaces between a fuel cell and the exterior of an aircraft for prevention of fire in the void spaces that may result from impact of a functioning incendiary ballistic projectile.

Another object of this invention is that of surrounding the fuel cell with an ablative, charring foam system to prevent intrusion of flames into the fuel cell.

Still another object of this invention is to provide a fiber-loaded foam with inherent ability to entrap or impede the progress of fragments that result from detonation of explosive charges near the foam-fiber system. Also, by maintaining its integrity the semi-rigid foam supports the walls of the cell around the wound so that closure of the wound in the self-sealing cell proceeds more readily.

The closed-cell foam of the present invention does not soak up fuel when the fuel cell is penetrated, thus preventing a secondary fire hazard. It provides a support to the fuel cell strong enough to withstand aircraft maneuvering so that a tank supporting basket is not required, thus decreasing the weight penalty to the aircraft. It provides a fire-protection system against external fires. The airframe structure is strengthened by the foam, thus reducing the likelihood of loss of fuel during a crash. The foam-fiber system reduces the likelihood of intrusion into the fuel cell by sharp objects during a crash or during a period when blast fragments or incendiary ballistics may be present.

SUMMARY OF THE INVENTION

The present invention is a closed cell, semi-rigid, fiber-loaded, self-extinguishing foam. It has the properties of retarding penetration of incendiary ballistics, prevention of fire in the void spaces of the aircraft, providing support for the fuel cell and strengthening the aircraft frame. The strength of the foam is enhanced by the fibers being oriented parallel to the surface of the substrate on which the foam is sprayed.

DESCRIPTION OF THE PREFERRED EMBODIMENTS

In accordance with the present invention a closed cell, semi-rigid, polyurethane foam forming matrix is provided and preferably it is a foam of a certain type as described hereinafter. In this foam, during or prior to forming the foam, there are added chopped fibers, and the matrix can also include alkyl halides and fire retardant chemicals. Preferably glass fibers are employed although other fibers can be used. During the formation of the foam, chopped fibers of one to one and one-half inches in length are incorporated in the matrix. The method of spraying the foam on the substrate results in the orientation of the fibers parallel to the surface of the substrate or perpendicular to the direction of rise of the foam. The fibers assume a random orientation in the plane parallel to the substrate surface.

The preferred polyurethane foam is formed by reacting a polycyclic aromatic polyisocyanate, drawn from the class of isocyanates, represented by the following structural formula:

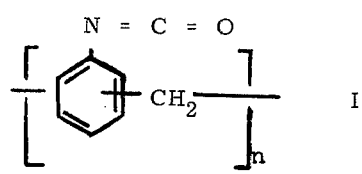

where n varies from 2 to 10, with a multifunctional polyol, wherein the polyol is preformed from the reaction of propylene oxide with a multifunctional polyol, with hydroxyl functionality greater than four, of the general structure:

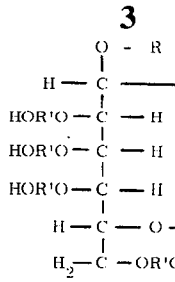

wherein R is a lower alkyl radical or hydrogen while R' is a lower alkyl.

Both the polycyclic aromatic character of the isocyanate and the highly branched functionality of the polyol are prerequisite for obtaining the desired high char yield and integrity as well as low molecular weight noncombustible species. However, the particular polycyclic aromatic polyisocyanate I and polyol II need not be used. For example, other ring systems may be used instead of the benzene ring in the aromatic polyisocyanate (e.g. naphthalene and heterocyclic rings such as isocyanurate or triazine) and the aromatic ring may be substituted as by methyl and chloro substituents.

In II the base is indicated as a hexose derivative which may be referred to as a glycoside. In the selected glycoside, R may be methyl or other alkyl or an aryl group, or it may be another saccharide unit (e.g. as in sucrose), or the glycoside may be replaced by oxidation products (e.g. glucuronic acid) or reduced products (e.g. sorbitol); or the polyol base may be any suitable halogen substituted or unsubstituted polyhydric alcohol having a sufficient number (e.g. four or more) available hydroxyl groups. Also, the isopropylene entity may be replaced by other groups, e.g. ethylene.

Suitable commercially available isocyanates such as Mondur MR in which $n$ is greater than two, with an isocyanate content of 32%, may be reacted with a commercially available polyol, such as Cord Polyether MEG 440, the oxy-propylene derivative of methyl ethyl glucoside. Cord Polyether MEG 440 is the trade name of Corn Products Co. for polyoxypropylene derivatives of methyl ethyl glucoside corresponding to Formula II above where R is methyl and R' is ethyl. Mondur MR is the trade name of Mobay Chemicals for a polycyclic aromatic polyisocyanate corresponding to Formula I above.

The preferred alkyl halide is polyvinylidene chloride. This may be obtained from Dow Chemical Co., Midland, Michigan, under the trademark of Saran A. Other halogen bearing polymers may be used which, like polyvinylidene chloride, are capable, upon heating to temperatures in the range of 100° to 300°C., of splitting off hydrogen chloride and producing a reactive polyene. A tercopolymer of vinyl chloride, vinyl acetate and maleic anhydride may be used, but Saran A produces a larger yield of HCl and a 40% char yield as compared to 8% char yield for the tercopolymer.

As stated, the foam also preferably contains a fire-retardant. The preferred fire retardant is tris (dichloropropyl) phosphate $(C_3H_5Cl_2)_3PO$ obtained from the Victor Division of Stauffer Chemical Co. under the tradename Fyrol FR-2. This is a more effective fire retardant compared to tris (2,3-dibromopropyl) phosphate or inorganic salts like potassium fluoroborate ($KBF_4$), ammonium bicarbonate, ammonium chloride, potassium silicofluoride, ammonium fluoroborate, sodium chloride and sodium bicarbonate, although the latter may also be used in this invention. Use of tris (dichloropropyl) phosphate does not degrade the friability characteristics of the foam and makes it more ballistic resistant. Additional details for preparing this foam may be found in Parker, et al., U.S. Pat. No.3,549,564.

In the present invention any fiber can be used, but the preferred fiber is glass. Fiberglass Roving, G-Filament, 60 strand, silicone 801 surface finish, chopped to 1 to 1½ inch lengths is entirely suitable. In the preferred practice of the present invention the foam sprayer is equipped with a glass fiber chopper. The preferred method of carrying out this invention is to incorporate glass fibers into the components of the foam after they are blended, just after exit from the sprayer nozzle.

The rate of spraying is critical to obtain an orientation of the glass fibers parallel to the substrate surface (in the X-Y plane). A too-fast spray or a high discharge rate results in a large number of fibers oriented parallel to the direction of rise of the foam or perpendicular to the substrate surface (i.e. in the z direction). This is an undesirable orientation for shockwaves will be transmitted more readily to the airframe along the fiber strands. A discharge rate of 2 to 5 pounds resin per minute results in the fibers being oriented perpendicular to the direction of rise of the foam or parallel to the substrate surface. Pulling against the ends of the fibers or the length of the fibers in the X-Y plan indicates a higher tensile strength due to the interaction of the fibers. The tensile strength in the z direction is lower due to less interaction of the fibers in that direction. Thus, the rate of spray application is critical to the quality of finished foam product and to the degree of ballistic shock damage that may be experienced by the foam and surrounding structure. Characteristics of foam forming are the cream time, rise time, and tack free time. Of these cream time and rise time are important to the rate of spray application. If the resin delivery rate is too fast, that is, if all of the required resin and fibers are deposited prior to the foam rising, then as the foam rises the fibers are carried upward in the rise direction and tend to orient themselves parallel to the rise or z direction. The x-y plane tensile strength is reduced and the z direction transmission of ballistic shock is increased.

If the resin delivery rate is too slow, that is, if between successive passes of the foam spray head enough time elapses for the foam to fully rise and start becoming tack free, then z direction tensil strength reduces markedly due to interlayer separation between the individual foam passes resulting again in poor ballistic performance when stressed by shock pressures.

Generally, one allows sufficient time to elapse between successive spray passes so that the resin creams, rises almost to its full extent and then spray again before the resin has become tack free. Typically the cream time range from 6 to 12 seconds, rise times from 15 to 25 seconds, and tack free times from 30 to 60 seconds for these formulations of ballistically tolerant foams.

The compressive strength of the foam is a function of the foam density and can support the fuel cell of an aircraft up to 10 times the force of gravity without the need of a fiberglass or other bag, as normally required for support, and without the high transmission of hydraulic ram pressure from the fuel cell to the aircraft structure as is found with rigid foamfiberglass composites that have a high degree of z oriented fibers or an excessive compressive strength.

Using glass fibers of three-fourth inches in length or less results in decreased ballistic protection. Ballistic protection increases with fibers up to about 2 or 3 inches in length but there is a decrease in good wetting of the fibers during spraying.

In the practice of the present invention, conventional methods of frothing, spraying, and pouring in place to form foams may be used. Also conventional blowing agents such as Freon 11, catalysts such as triethylene diamine in a glycol solvent or carrier under the tradename Dabco 33-Lv, and surfactants such as DC-195 silicone lubricants (i.e. silicone resin methyl siloxane) are used. (Freon is a tradename of Du Pont; Dabco is a tradename of Houdry Chemical Company; and DC-195 is a tradename of Dow-Corning.) Various methods of incorporating these modifying agents will be apparent to, and may be employed by, one skilled in the polyurethane art.

In this invention the amount of Dabco 33-LV catalyst used is critical. A foam containing 1.4 parts by weight is too friable. The preferred composition at very high ambient temperature (95°F) is 8 parts by weight and at normal ambient temperature 10 parts by weight. Too high a concentration of catalyst above 95°F speeds up the polymerization reaction so much that the spray gun gets clogged. This concentration of catalyst reduces friability and improves ballistic properties and yet provides a foam sufficiently dense to support the fuel cell.

Local ambient conditions also dictate the content of Freon 11 or other blowing agent. A high ambient temperature requires less Freon 11 to form a foam of density between 2.0 to 2.8 PCF. The desired final foam density and the ambient conditions dictate the catalyst and blowing agent concentrations used. The following specific examples will illustrate further the practice and advantages of the invention:

EXAMPLE I

| Formulation | Parts by weight |
| --- | --- |
| Part A: | |
| Mondur MR | 100.0 |
| Saran A | 16.5 |
| Part B: | |
| Cord Polyether MEG 440 | 65.0 |
| Fyrol FR-2 | 10.0 |
| DC-195 | 2.0 |
| Dabco 33-LV | 8.0 |
| Freon-11 | 25.9 |
| Part C: | |
| Fiberglass Roving, G-Filament, 60 strand, silicone 801 surface finished, chopped to 1⅛ to 1¼ inch length | 40.1 |

Part A and Part B were mixed together and sprayed through a nozzle wherein component C was added from a chopper. A fire-retardant material was obtained, having a density of 2.8 PCF. The mixture had a cream time:≈10 sec, rise time:≈20 sec, and tack free time:≈60 sec.

EXAMPLE II

The process of Example I was repeated, except that the composition was as follows:

| Formulation | Parts by weight |
| --- | --- |
| Part A: | |
| Mondur MR | 100.0 |
| Part B: | |
| Cord Polyether MEG 440 | 65.0 |
| KBF₄ | 16.5 |
| VMCH* | 16.5 |
| DC-195 | 0.9 |
| Dabco 33-LV | 4.5 |
| *Vinylite resin Union Carbide | |
| Fyrol FR-2 | 10.0 |
| Freon-11 | 37.0 |
| Part C: | |
| Fiberglass Roving, G-Filament, 60 strand, silicone 801 surface finish, chopped to 1⅛ to 1¼ inch length | 44.2 |

These formulations contain normally 15% by weight of chopped fiberglass at 1⅛ to 1¼ inch length. Other variations have been made varying the quantity, length, and type of fibers. The quantities have been varied from 5 to 30% by weight, the lengths from ¼ inch to 2½ inch in length and the fibers have been fiberglass as stated above, quartz, refraisil, E glass, nylon ("Normex"), elastic, rubberbands and others. The stated formulations were the result of optimizing for minimum production costs, maximum ballistic tolerance and sprayability when the prime threat ballistic projectile was 12.7 mm armor piercing incendiary (API). Other projectile threats might dictate fiber change consistent with these threat changes. If the prime threat were exploding warheads, for instance, then longer fiber lengths at a correspondingly greater weight percentage of fibers might be called for.

EXAMPLE III

| Formulation | Parts by weight |
| --- | --- |
| Part A: | |
| Mondur MR | 100 |
| VMCH | 16.5 |
| Part B: | |
| Cord Polyether MEG 440 | 75 |
| L5340 - (Union Carbide surfactant silaine-glycol copolymer) | 2 |
| Dabco 33-LV | 2.0 |
| Freon-11 | 37 |
| Part C: | |
| Fiberglass Roving chopped to ¼ inch length | 98 |

A special nozzle giving a flat or fan spray was used for good fiber wetting and foam distribution in the molds. This is in contrast to the typical 360° nozzle used in conventional foam spraying.

EXAMPLE IV

| Formulation | Parts by weight |
| --- | --- |
| Part A: | |
| Mondur MR | 100 |
| Saran A | 16.5 |
| Part B: | |
| Cord Polyether MEG 440 | 65.0 |
| Fyrol FR-2 | 10.0 |
| Dabco 33-LV | 16 |
| DC-195 | 2 |
| Freon-11 | 25 |
| Part C: | |
| Fiberglass Roving chopped to 1 inch length | 45 |

The foam block had very high resiliency. Samples showed no brittleness as evidenced by low friability.

EXAMPLE V

| Formulation | Parts by weight |
| --- | --- |
| Part A: | |
| Mondur MR | 100 |
| Saran A | 16.5 |
| Part B: | |
| Cord Polyether MEG 440 | 55 |
| Fryol FR-2 | 10 |
| Dabco 33-LV | 4 |
| DC-195 | 2 |
| Freon-11 | 30 |
| Part C: | |
| Fiberglass Roving chopped to 2½ inch length | 45 |

In this example a high dispensing rate of about 20 lbs. per minute was used to obtain a large mass effect at a low catalyst concentration.

EXAMPLE VI

| Formulation | Parts by weight |
| --- | --- |
| Part A: | |
| Mondur MR | 100 |
| Saran A | 16.5 |
| Part B: | |
| Pluracol 201 (Wyandotte Chemical) | 65 |
| Antimony Trioxide | 5 |
| Dabco 33-LV | 6 |
| DC-195 | 2 |
| Freon-11 | 26 |
| Part C: | |
| No. 14 Rubber bands | 65 |

The rubber bands were piled loosely and randomly in the mold and foam was dispensed at approximately 25 lbs. per minute, thoroughly penetrating the bands. The Pluracol 201 is similar chemically to Cord polyether MGM 440.

EXAMPLE VII

| Formulation | Parts by weight |
| --- | --- |
| Part A: | |
| Mondur MR | 100 |
| Part B: | |
| Cord Polyether MEG 440 | 65 |
| Saran A | 16.5 |
| DC-195 | 2 |
| Dabco 33-LV | 12 |
| Freon-11 | 30 |
| Part C: | |
| Nylon Fibers (Nomex) | 20 |

The fibers were previously coated with a solution of polyvinylidene fluoride and dried. The fibers were scattered loosely in the mold and foam was dispensed at 10 lbs. per minute.

EXAMPLE VIII

| Formulation | Parts by weight |
| --- | --- |
| Part A: | |
| Mondur MR | 100 |
| Silicone Rubber Strips | 20 |
| Part B: | |
| Cord Polyether MEG 440 | 65 |

EXAMPLE VIII-Continued

| Formulation | Parts by weight |
| --- | --- |
| Polyvinylidene fluoride | 16.5 |
| DC-195 | 2 |
| Dabco 33-LV | 8 |
| Freon-11 | 30 |
| Silicone rubber strips ¼ inch to 4 inch lengths were mixed into Part A previously to blending Part A & B | |

EXAMPLE IX

| Formulation | Parts by weight |
| --- | --- |
| Part A: | |
| Mondur MRS | 100 |
| L5340 | 2 |
| Part B: | |
| Polyol 31-45 | 50 |
| KBF₄ | 13 |
| ZnO | 13 |
| Freon | 25 |
| DMP-30 | 18 |
| Part C: | |
| Fiberglass Roving 1¼ inch | 26 |

Polyol 31-45 is a vinyl reinforced polyoxypropylene glycerin derivative having a grafted nitrile functionality — Union Carbide. Isocyanate rings are formed which can be detected spectroscopically.

DMP-30 is made by Rohm & Haas Co. and is an aromatic amine catalyst (tridimethylaminoethyl phenol) in contrast to the al; phatic catalyst used in Example I.

EXAMPLE X

| Formulation | Parts by weight |
| --- | --- |
| Part A: | |
| Mondur MRS | 100 |
| L5340 | 2 |
| Part B: | |
| Polyol 31-45 | 75 |
| ZnO | 13 |
| KBF₄ | 35 |
| Freon | 35 |
| DMP-30 | 18 |
| Part C: | |
| Silica Fibers - 1 inch Refrasil - Hitco Co. | 10 |

It will therefore be apparent that a novel and very useful polyurethane foam-based heat insulating, fire resistant and suppressant, and ballistic resistant material has been provided.

We claim:

1. A fiber modified closed-cell semi-rigid polyurethane foam matrix for ballistic and fire protection prepared by:
   A. spraying from a nozzle onto a substrate at the rate of 2-5 No. per minute to obtain fiber orientation parallel to the substrate surface a reaction mixture comprising:
      1. a polycyclic aromatic polyisocyanate,
      2. a polyol having an OH functionality of at least four,
      3. a vinyl halide polymer,
      4. an inorganic flame retardant,
      5. a silicone surfactant, 6. 4.1 - 5.1% by weight triethylene diamine based on the weight of polyol,
7. a blowing agent, and
8. 8.2 - 10.2% by weight ethylene glycol based on the weight of polyol;

B. blending into said reaction mixture as it is sprayed from the spray nozzle, chopped fibers having a length of ¾ to 3 inches;

C. allowing the sprayed reaction mixture to foam at ambient conditions.

2. A foam of claim 1 wherein the polycyclic aromatic polyisocyanate comprises 31.5 – 32% active NCO groups and has a viscosity of 200 cps at 25°C.

3. A foam of claim 2 wherein the polyol is a lower alkylene oxide addition product of a glycoside having an OH functionality of at least four.

4. A foam of claim 1 wherein the inorganic flame retardant is tris (dichlorospropyl) phosphate.

5. A foam of claim 1 wherein the catalyst consists of 4.1% by weight triethylene diamine based on the weight of polyol.

6. A foam as in claim 3 wherein (3) is a poly (vinylidene chloride), (4) is tris (dichloropropyl) phosphate, (6) the catalyst consists of 4.1% by weight triethylene diamine based on the weight of polyol, and (7) is $CCl_3F$.

7. A foam as in claim 3 wherein the fibers are glass fibers of 1 to 1½ inches in length.

8. A foam of claim 6 wherein the fibers are glass fibers of 1⅛ to 1¼ inches in length and the ratio of fibers to polyurethane is from 5 to 30% by weight.

9. A foam of claim 3 which comprises the application of successive spray passes in order to increase the thickness of the foam matrix wherein the resin is allowed to cream and rise almost to its full extent between successive passes and on the final pass allowing the resin to cure until tack free.

10. A fiber modified closed-cell semi-rigid polyurethane foam matrix for ballistic and fire protection prepared by A. spraying from a nozzle onto a suubstrate at the rate of 2-5 per minute to obtain fiber orientation parallel to the substrate surface a reaction mixture comprising:
1. a polycyclic aromatic polyisocyanate prepared by phosgenation of aniline and formaldehyde in a mineral acid, said polyisocyanate having 31.5 – 32% active NCO groups and a viscosity of about 200 cps at 25°C.,
2. a polyol comprising the reaction product of a lower alkylene oxide and a glycoside having an OH functionality greater than four,
3. a vinylidene halide polymer,
4. tris (dichloropropyl) phosphate,
5. a silicone surfactant,
6. a catalyst consisting of 4.1% by weight triethylene diamine based on the weight of polyol,
7. a blowing agent, and
8. 8.2% by weight ethylene glycol based on the weight of polyol.

B. blending into the reaction mixture as it exists from the spray nozzle, 5–30% by weight based on the foam matrix weight of chopped glass fibers having a length of 1⅛ to 1¼ inches:

C. allowing the sprayed reaction mixture to foam under ambient conditions, wherein the foam exhibits a cream time of 6–12 seconds, rise time of 12–25 seconds, and tack free time of 30–60 seconds.

11. A process for making a fiber modified polyurethane matrix for ballistic and fire protection comprising:

A. mixing a reaction mixture comprising
1. polycyclic aromatic polyisocyanate,
2. a polyol having an OH functionality of at least four,
3. a vinyl halide polymer,
4. as a flame retardant tris (dichloropropyl) phosphate,
5. a silicone surfactant,
6. 4.1 - 5.1% by weight triethylene diamine based on the weight of polyol,
7. a blowing agent, and
8. 8.2 - 10.2% by weight ethylene glycol based on the weight of polyol;

B. spraying reaction mixture A through a nozzle onto a substrate at the rate of 2-5 per minute so as to orient the fibers parallel to the substrate surface;

C. blending into the spray as the reaction mixture is sprayed from the nozzle, chopped fibers having a length of ¾ to 3 inches, the ratio of fibers to resin varying from 5-30% by weight;

D. allowing the sprayed reaction mixture to foam under ambient conditions.

12. A process as in claim 11 wherein the polyol is a lower alkylene oxide addition product of a glycoside having an OH functionality of at least four.

13. A process as in claim 11 wherein the catalyst consists of 4.1% by weight triethylene diamine based on the weight of polyol.

14. A process as in claim 13 wherein the chopped fibers are 1⅛ to 1¼ inches in length.

15. A process as in claim 13 comprising the application of successive spray passes in order to increase the thickness of foam wherein the resin is allowed to cream and rise almost to its full extent between successive passes and on the final pass allowing the resin to cure until tack free.

16. A fiber modified polyurethane foam matrix for ballistic and fire protection prepared by spraying onto a substrate at the rate of 2–5 No. per minute to obtain fiber orientation parallel to the substrate surface a reaction mixture comprising:
1. a polyisocyanate aromatic polyisocyanate,
2. a polyol comprising the addition product of a lower alkylene oxide and a glycoside having an OH functionality of at least four,
3. a vinyl halide polymer,
4. tris (dichloroproply) phosphate as a flame retardant,
5. a silicone surfactant.
6. 4.1 – 5.1% by weight triethylene diamine based on the weight of polyol,
7. a blowing agent,
8. 5–30% by weight based on the weight of foam matrix of glass fibers chopped to a length of ¾ to 3 inches, and
9. 8.2 - 10.2% by weight ethylene glycol based on the weight of polyol.

17. A foam as in claim 16 wherein the chopped fibers are 1⅛ to 1¼ inches in length.

* * * * *